Sept. 25, 1945. W. F. WITTE, JR 2,385,594
UTENSIL COVER
Filed Jan. 25, 1944 2 Sheets-Sheet 2
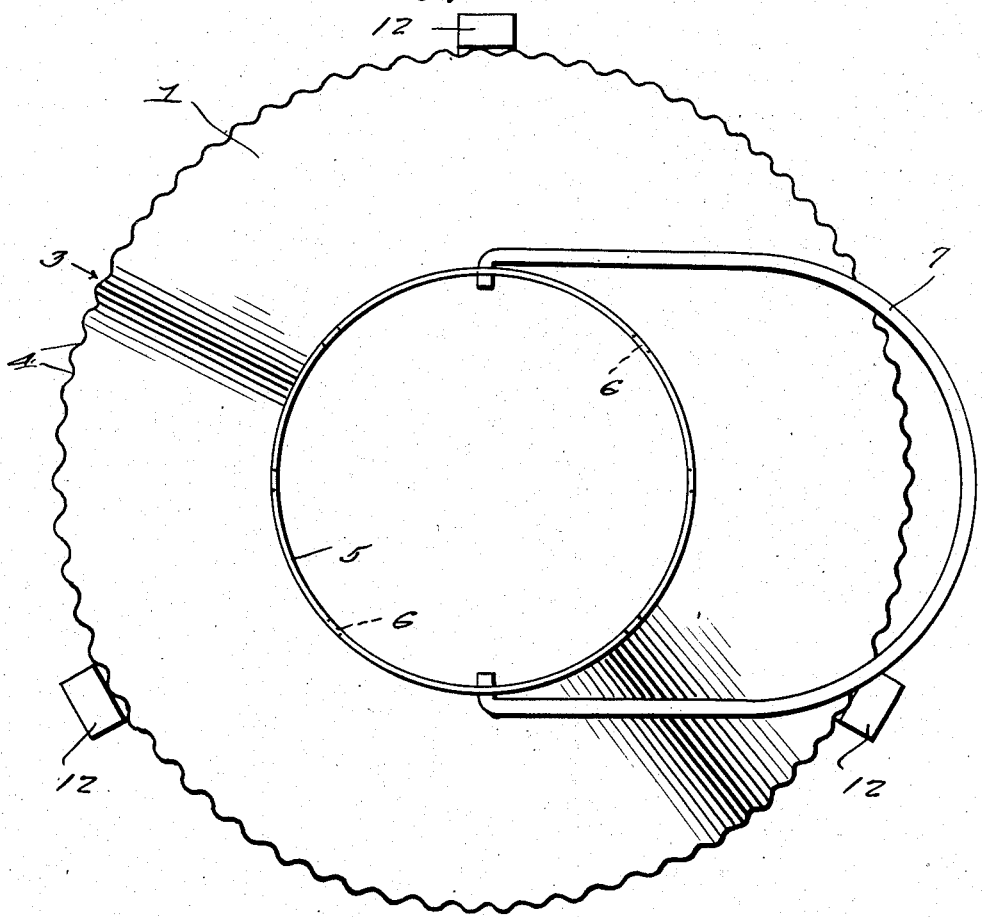
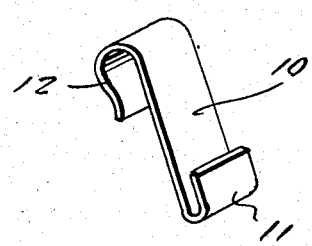
Inventor
WILLIAM F. WITTE, Jr.
By Clarence A. O'Brien
and Harvey B. Jacobson
Attorneys Patented Sept. 25, 1945

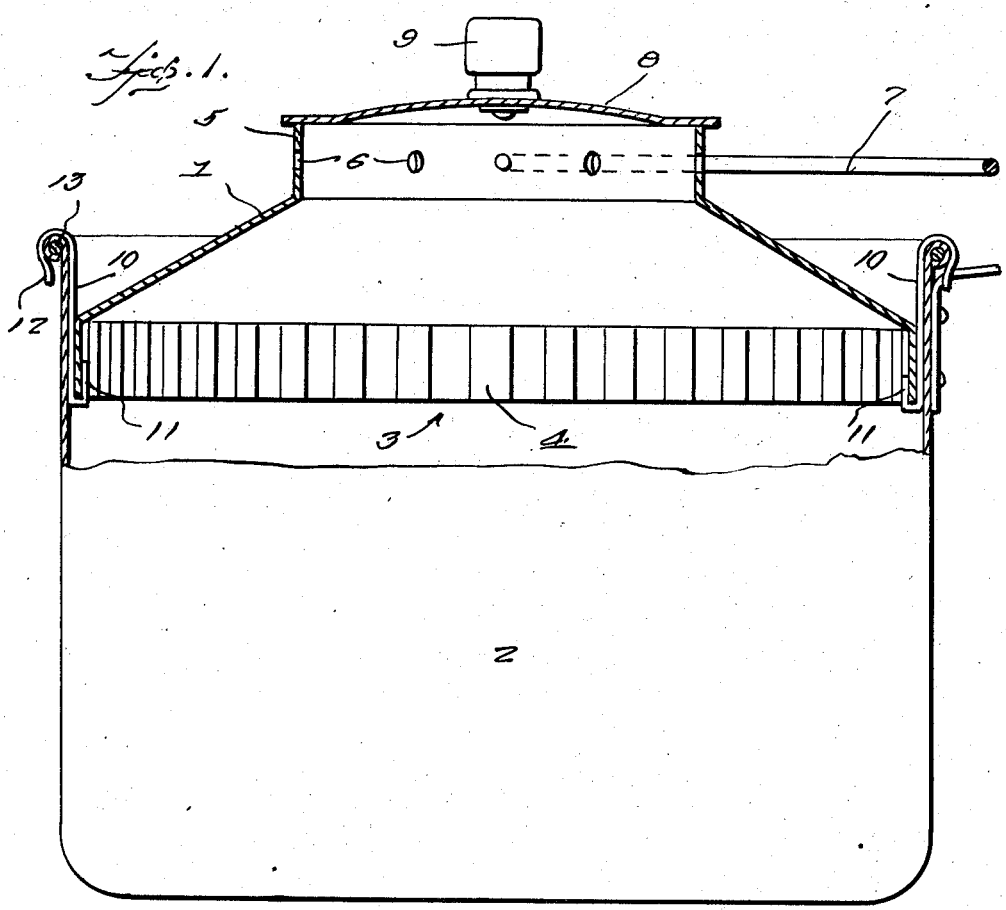
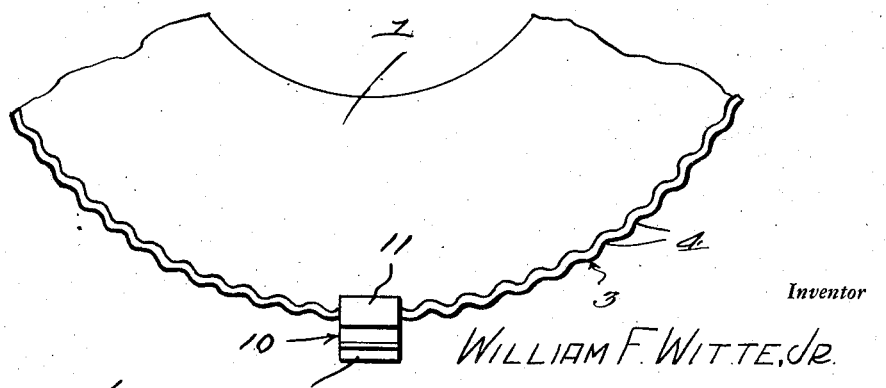

2,385,594

UNITED STATES PATENT OFFICE 2,385,594

UTENSIL COVER

William F. Witte, Jr., Omaha, Nebr.

Application January 25, 1944, Serial No. 519,679

1 Claim. (Cl. 126—384)

The present invention relates to new and useful improvements in covers, particularly for cooking utensils, and has for its primary object to provide, in a manner as hereinafter set forth, a device of this character comprising a novel construction and arrangement for preventing loss of the contents of the utensil and extinguishing of the fire therebeneath, as sometimes occurs, as a result of boiling over.

Other objects of the invention are to provide a cooking utensil cover of the aforementioned character which will be comparatively simple in construction, strong, durable, highly efficient and reliable in use, compact and which may be manufactured at low cost.

All of the foregoing, and still further objects and advantages of the invention, will become apparent from a study of the following specification, taken in connection with the accompanying drawings wherein like characters of reference designate corresponding parts throughout the several views, and wherein:

Figure 1 is a view in vertical section through a cover constructed in accordance with the present invention, showing the device mounted in a cooking utensil, the upper portion of which is broken away in section.

Figure 2 is a top plan view of the device with the lid omitted.

Figure 3 is a fragmentary view in bottom plan.

Figure 4 is a detail view in perspective of one of the securing elements.

Referring now to the drawings in detail, it will be seen that the embodiment of the invention which has been illustrated comprises a substantially frusto-conical body 1 of suitable dimensions to fit within the upper portion of a conventional cooking utensil, as at 2. The body 1 may be of metal or other suitable material. Depending from the periphery of the body 1 is an integral, annular flange 3 which is engageable in the utensil 2. The flange 3 is vertically corrugated to provide drain passages 4 between said flange and the walls of the utensil 2.

Rising from the body 1 is an annular neck 5 having ports 6 therein at circumferentially spaced points. A bail 7 is mounted for swinging movement on the neck 5. Removably mounted on the neck 5 is a lid 8 comprising a knob or handle 9.

Fixed on the flange 3 and rising therefrom are metallic anchor bars 10. At their lower ends, the bars 10 are provided with upturned hooks 11 in which the flange 3 is engaged and to which said hooks are fixed. At their upper ends, the bars 10 terminate in outwardly, downwardly and inwardly curved resilient clips 12 which are adapted to snap over the usual bead 13 on top of the utensil 2 for releasably securing the cover in position therein. Any suitable number of the members 10 may be provided.

It is thought that the operation of the device will be readily apparent from a consideration of the foregoing. Briefly, the cover is inserted downwardly in the upper portion of the utensil 2 and the resilient clips 12 are engaged with the bead 13 of said utensil. Should the contents of the utensil boil up under the cover, the steam and fluid may escape through the ports 6. The fluid flows by gravity down the substantially frusto-conical body 1 of the cover and returns to the utensil 2 through the vertical drain passages 4 defined in the flange 3 by the corrugations thereof. Access to the utensil 2 with the device mounted in position thereon may be readily had at any time by removing the lid 8. The bail 7 facilitates handling the device.

It is believed that the many advantages of a utensil cover constructed in accordance with the present invention will be readily understood, and although a preferred embodiment of the device is as illustrated and described, it is to be understood that changes in the details of construction may be resorted to which will fall within the scope of the invention as claimed.

What is claimed is:

A utensil cover of the character described comprising a substantially frusto-conical body engageable in the upper portion of a utensil, an integral neck rising from the body, said neck having a plurality of circumferentially spaced fluid discharge ports therein, a lid removably mounted on the neck, a vertical annular flange depending from the periphery of the body and insertable within the utensil, said flange having vertical corrugations therein defining passages for returning by gravity to the utensil the fluid escaping therefrom through the ports, and means for detachably securing the body in position in the utensil, said means including metallic bars mounted vertically on the flange, said bars including hooks on their lower ends, the flange being engaged in and fixed to said hooks, and resilient clips on the upper ends of the bars engageable with the upper portion of the utensil.

WILLIAM F. WITTE, JR.